(12) United States Patent
Fukuda

(10) Patent No.: US 8,743,383 B2
(45) Date of Patent: Jun. 3, 2014

(54) IMAGE PROCESSING APPARATUS STORING DESTINATION INFORMATION AND INFORMATION INDICATING WHETHER A USER IS ALLOWED TO PRINT IMAGE DATA AND CONTROL METHOD THEREFOR

(75) Inventor: Shin Fukuda, Port Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 12/697,402

(22) Filed: Feb. 1, 2010

(65) Prior Publication Data
US 2010/0195151 A1  Aug. 5, 2010

(30) Foreign Application Priority Data
Feb. 5, 2009  (JP) ................................. 2009-025096

(51) Int. Cl.
*G06K 15/00*  (2006.01)
(52) U.S. Cl.
USPC .......................... 358/1.14; 358/1.15; 358/1.16
(58) Field of Classification Search
CPC .......... H04N 1/00204; H04N 1/00875; H04N 2201/0039; H04N 2201/0065; H04N 2201/0094
USPC ................................................ 358/1.11–1.18
See application file for complete search history.

(56) References Cited

U.S. PATENT DOCUMENTS

| 6,404,921 | B1 | 6/2002 | Ishida | |
|---|---|---|---|---|
| 6,625,265 | B2 * | 9/2003 | Kesten et al. | 379/100.11 |
| 6,799,302 | B1 * | 9/2004 | Sites | 715/210 |
| 2005/0151994 | A1 * | 7/2005 | Takahashi | 358/1.15 |
| 2005/0276519 | A1 * | 12/2005 | Kitora et al. | 382/305 |
| 2006/0044601 | A1 * | 3/2006 | Misawa et al. | 358/1.15 |
| 2006/0044607 | A1 * | 3/2006 | Kato | 358/1.15 |
| 2006/0114485 | A1 * | 6/2006 | Sato | 358/1.13 |
| 2006/0184543 | A1 | 8/2006 | Fukuta | 707/10 |
| 2006/0256370 | A1 * | 11/2006 | Murakawa | 358/1.15 |
| 2006/0290963 | A1 * | 12/2006 | Sakuraba et al. | 358/1.13 |
| 2007/0103712 | A1 * | 5/2007 | Corona | 358/1.14 |
| 2007/0201926 | A1 * | 8/2007 | Kato | 400/62 |

(Continued)

FOREIGN PATENT DOCUMENTS

| JP | 4-157578 | 5/1992 |
|---|---|---|
| JP | 2001-101161 A | 4/2001 |

(Continued)

OTHER PUBLICATIONS

Japanese Office Action dated Nov. 30, 2012, in counterpart Japanese Application No. 2009-025096.

*Primary Examiner* — Benny Q Tieu
*Assistant Examiner* — Quyen V Ngo
(74) *Attorney, Agent, or Firm* — Fitzpatrick, Cella, Harper & Scinto

(57) ABSTRACT

In an image processing apparatus, when converting an input image into vector data, converting the vectorized image into data in a file format which can be used in application software, and transferring the converted data in the file format, the image processing apparatus acquires information specifying a destination of the transfer and determines the file format into which the vectorized image is to be converted according to the acquired information specifying the destination. With this configuration, it is possible to provide the image processing apparatus and a control method for the same that allow transfer after conversion into an appropriate file format for each use case.

10 Claims, 12 Drawing Sheets

| | | 1201 | 1202 | 1203 |
|---|---|---|---|---|
| | | USING GROUP | POST RESTRICTION | PRINT RESTRICTION |
| 1210 | FILE FORMAT A | ALL DEPARTMENTS | NONE | OK |
| | FILE FORMAT B | HR ACCOUNT | NONE | NG |
| | FILE FORMAT C | DEVELOP1 | NONE | OK |
| | FILE FORMAT D | HR DEVELOP2 | SECTION MANAGER OR HIGHER POSITION | NG |

1200

(56) References Cited

U.S. PATENT DOCUMENTS

| | | | |
|---|---|---|---|
| 2008/0127307 A1* | 5/2008 | Fukuta | 726/3 |
| 2008/0168034 A1* | 7/2008 | Tsuchiya | 707/3 |
| 2008/0174811 A1* | 7/2008 | Tanaka et al. | 358/1.15 |
| 2009/0165141 A1* | 6/2009 | Kakehi et al. | 726/26 |
| 2010/0037286 A1* | 2/2010 | Cain | 726/1 |
| 2010/0202007 A1* | 8/2010 | Kamekawa | 358/1.14 |
| 2010/0328723 A1* | 12/2010 | Kamekawa | 358/1.15 |

FOREIGN PATENT DOCUMENTS

| | | | | |
|---|---|---|---|---|
| JP | 2007-041772 A | | 2/2007 | |
| JP | WO2007026915 | * | 3/2007 | G06F 21/24 |
| JP | 2007-133475 A | | 5/2007 | |
| JP | 2007-183743 A | | 7/2007 | |

* cited by examiner

F I G. 5

500

```
<?xml version="1.0" standalone="no" ?>
-<ROOT>
  -<PROFILES spec-profile="default">
    -<PROFILE id="default"configured="true">
       <DEVICETYPE id="computer"/>
       <CPU_SPEC id="CSC Xeon"freq="2800"/>
       <MEMORY_SIZE id="MEM"size="2039"class="4"/>
      -<APPLICATION id="APP" file-create="0">
         <List>WORD VIEWER</List>
         <List>STYLESHEET</List>
         <List>Internet Browser</List>
         <List>Press Design</List>
       </APPLICATION>
    </PROFILE>
  </PROFILES>
</ROOT>
```

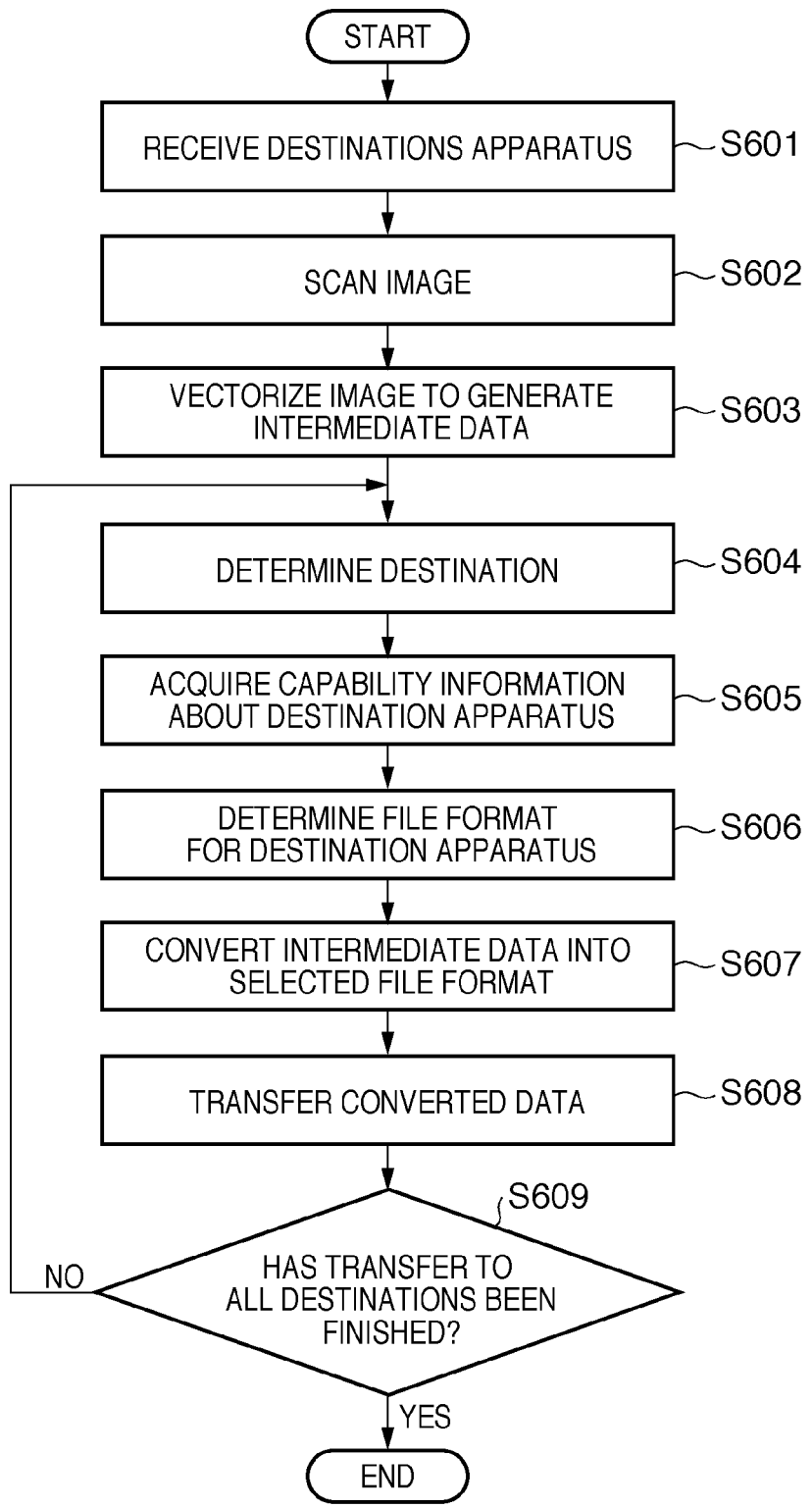

FIG. 7

| | | RECOMMENDED CAPABILITIES | | | |
|---|---|---|---|---|---|
| | CPU | MEMORY | NECESSARY APPLICATION | COMMUNICATION RATE | COLOR FORMAT |
| FILE FORMAT A | P3 1500 MHz | 256 MB OR MORE | WORD VIEWER | 1MBPS | CMYK |
| FILE FORMAT B | P4 2000 MHz | 1024 MB OR MORE | STYLESHEET | 1MBPS | RGB |
| FILE FORMAT C | P4(Dual Core) 2000 MHz | 1024 MB OR MORE | Internet Browser | 8MBPS | RGB CMYK |
| FILE FORMAT D | P2 800 MHz | 256 MB OR MORE | Press Design | 2MBPS | RGB Lab |
| -------- | | | | | |

FIG. 12

| | USING GROUP 1201 | POST RESTRICTION 1202 | PRINT RESTRICTION 1203 |
|---|---|---|---|
| FILE FORMAT A | ALL DEPARTMENTS | NONE | OK |
| FILE FORMAT B | HR ACCOUNT | NONE | NG |
| FILE FORMAT C | DEVELOP1 | NONE | OK |
| FILE FORMAT D | HR DEVELOP2 | SECTION MANAGER OR HIGHER POSITION | NG |

1200

1210

IMAGE PROCESSING APPARATUS STORING DESTINATION INFORMATION AND INFORMATION INDICATING WHETHER A USER IS ALLOWED TO PRINT IMAGE DATA AND CONTROL METHOD THEREFOR

BACKGROUND OF THE INVENTION

1. Field of the Invention

The present invention relates to an image processing apparatus and a control method for the same that allow digitization of original information and generation of data reusable in other apparatuses.

2. Description of the Related Arts

Conventionally, an information processing apparatus such as a multi-function printer/peripheral (hereinafter referred to as an MFP) has a function of transforming data of a scanned original or print data received over a network into bitmap data and then storing the data. The stored print data can be transferred to other apparatuses and reused there.

For example, a paper document can be converted into digital data and sent to any destination through e-mail or FTP communication. At this point, conventionally the bitmap data is transferred after being converted into a file format such as a common image format like TIFF or JPEG, or the PDF format, which is a document format developed by Adobe Systems Incorporated. In this case, once the data is transformed into the bitmap data, text information and vector information are lost. This prevents later flexible editing.

However, in recent years, techniques have been disclosed by which vector information is restored from an input image or print data and stored in an information processing apparatus to allow later reuse.

For example, there are techniques of converting an image of a text region included in an original into vector data. Japanese Patent Laid-Open No. 4-157578 discloses a technique by which a contour by connected pixels in a binary image is obtained as a functional description. By using this data in a document creating application, geometric deformation and coloring can be easily performed for change of the position or size in a character unit. Data described vectorially by using such a technique can be used in applications capable of editing line drawings.

In this manner, image data input to an information processing apparatus can have vector information, so that the data can be converted into various file formats depending on the purpose of later reuse. The vectorization also provides reduction in data amount compared to the image data.

However, due to the convertibility into various file formats, the task for a user to determine which file format is optimal and select a conversion format in each use case becomes troublesome.

For example, even if one user considers a file format A as an optimal conversion format, another user may consider a file format B different from the file format A as optimal because the other user does not have an application for editing the file format A. In other possible cases, some file formats may reduce the edit efficiency in a user's environment or may prevent a user from using an edit function the user wants to use. Therefore, a user has had to determine a file format from many choices.

SUMMARY OF THE INVENTION

The present invention provides an image processing apparatus and a control method for the same that allow transfer after conversion into an appropriate file format for each use case.

To solve the above problems, the image processing apparatus according to the present invention comprises: an image vectorization unit configured to convert an input image into vector data; a conversion unit configured to convert the vector data into data in a file format which can be used in an application; a data transfer unit configured to transfer the data in the file format converted by the conversion unit to a destination; an information acquiring unit configured to acquire information specifying the destination to which the data is transferred by the data transfer unit; and a file format determination unit configured to determine the file format into which the vector data is to be converted by the conversion unit according to the information specifying the destination acquired by the information acquiring unit.

The present invention also provides a method of controlling an image processing apparatus, comprising the steps of: first converting an input image into vector data; second converting the vector data into data in a file format which can be used in an application; transferring the data in the file format converted in the second converting step to a destination; acquiring information specifying the destination to which the data is transferred in the transferring step; and determining the file format into which the vector data is to be converted in the conversion according to the information specifying the destination acquired in the acquiring step.

According to the present invention, the image processing apparatus performs transfer after conversion into an appropriate file format for each use case. This saves a user's trouble to determine a file format for each destination when digitizing and retrieving information about an original containing various types of elements. Therefore, convenience is enhanced.

Further features of the present invention will become apparent from the following description of exemplary embodiments with reference to the attached drawings.

BRIEF DESCRIPTION OF THE DRAWINGS

FIG. 5 is a diagram showing exemplary destination processing capability acquired from a destination apparatus according to the first embodiment;

FIG. 6 is a flowchart showing exemplary operation steps of the image processing apparatus in the first embodiment;

FIG. 7 is a diagram showing an exemplary file format table indicating selectable file formats and capability information recommended for referring to the respective file formats according to the first embodiment;

FIG. 12 is a diagram showing an exemplary file format table indicating selectable file formats and information such as authority for referring to the respective file formats according to the second embodiment.

DESCRIPTION OF THE EMBODIMENTS

Embodiments of the present invention will be described in detail below with reference to the attached drawings.

<Exemplary System Configuration in Embodiments>

Figure 1:
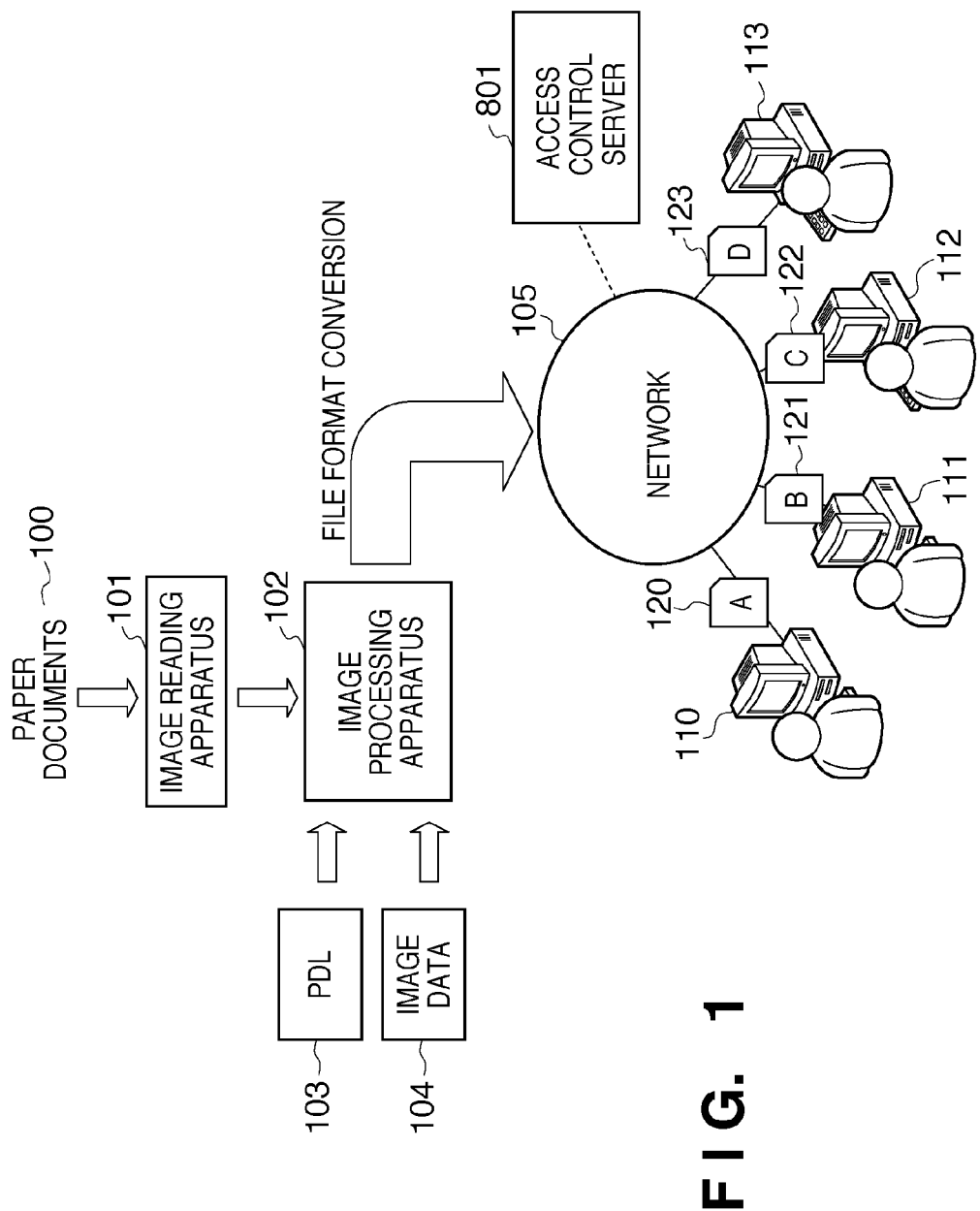
FIG. 1 is a schematic diagram showing that an image processing apparatus transfers input data to destination apparatuses in a system according to embodiments.

FIG. 1 is a schematic diagram showing that a system according to the embodiments converts the file format of input data and transfers the data to destination apparatuses.

Reference numeral 100 denotes originals, for example paper documents. Reference numeral 101 denotes an image reading apparatus such as a scanner. In the drawings to be described below, image data that is output from the image reading apparatus such as a scanner is denoted by reference numeral 101. Reference numeral 102 denotes an image processing apparatus typified by an MFP and the like. Reference numeral 103 denotes print data (hereinafter referred to as PDL) written in PDL and transferred from a higher-level apparatus such as a host computer (not shown). Reference numeral 104 denotes image data directly transferred from a memory medium or the like. As shown in FIG. 1, besides scanned images of the paper documents 100, the PDL 103 and the image data 104 are also input to the image processing apparatus 102. Reference numeral 105 denotes a communication network such as the Internet connection. Reference numerals 110 to 113 denote destination apparatuses (terminals) connected to the network 105. The image processing apparatus 102 converts the file format of input image data and transfers the data to the destination apparatuses 110 to 113 connected to the network 105. Reference numerals 120 to 123 denote files with the file format converted.

In the embodiments, the image processing apparatus 102 performs transfer after converting the file format as appropriate depending on the data destinations. Therefore, the files 120 to 123 are not necessarily in the same file format. In the example of FIG. 1, each file is in a different file format such that the file 120 is in a file format A, the file 121 is in a file format B, the file 122 is in a file format C, and the file 123 is in a file format D.

Reference numeral 801 denotes an access control server that manages a user information table used in a second embodiment.

First Embodiment

A first embodiment uses, as information specifying each destination, a destination apparatus or the capability of the destination apparatus.

<Exemplary Configuration of Apparatuses in System in First Embodiment>

Figure 2:
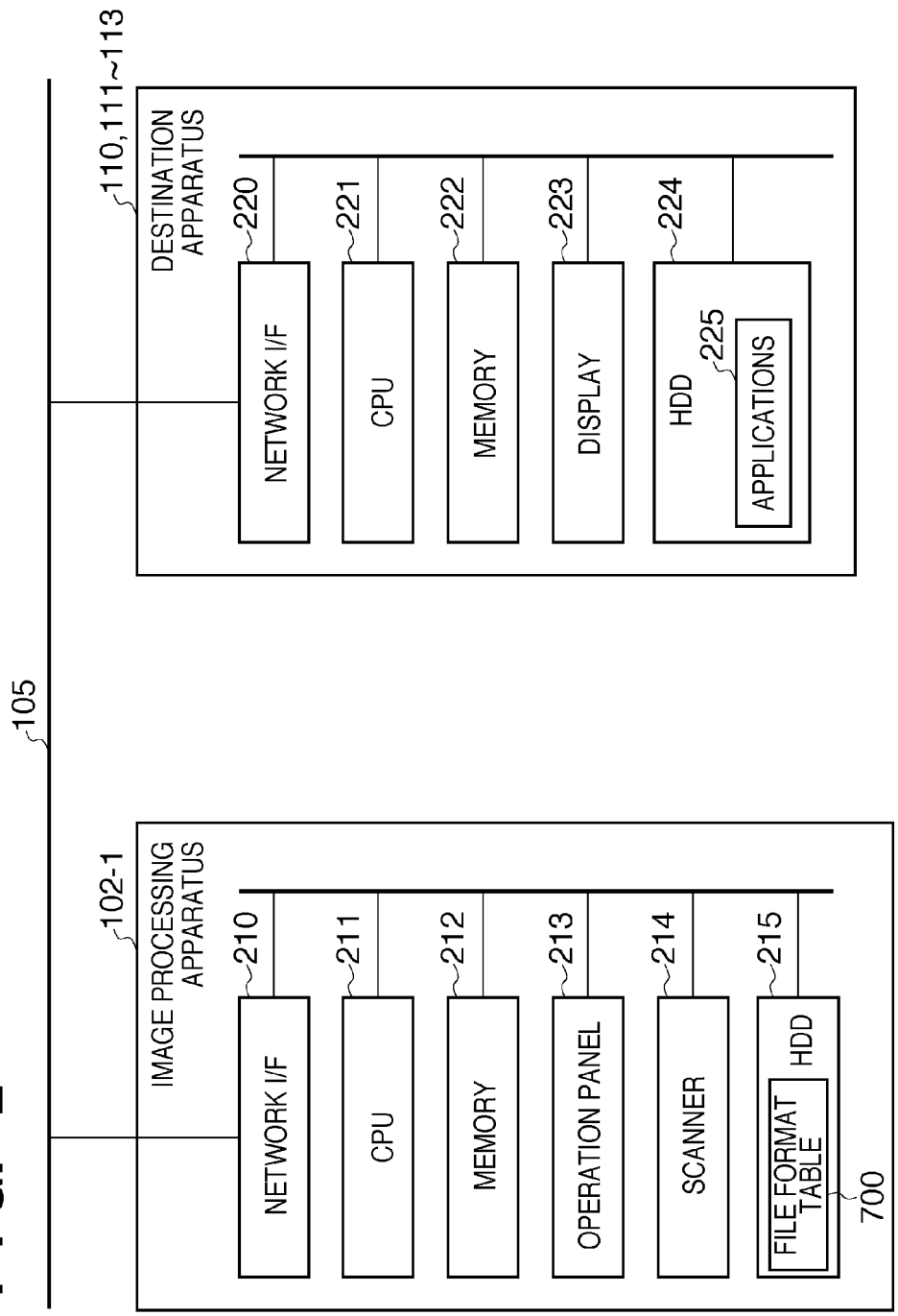
FIG. 2 is a block diagram showing an exemplary configuration of apparatuses in the system according to a first embodiment.

FIG. 2 is a block diagram showing an exemplary configuration of apparatuses in the system according to the first embodiment of the present invention.

The system consists of the image processing apparatus 102-1 (corresponding to the image processing apparatus 102 in FIG. 1) and the destination apparatus 110 (or 111-113). The image processing apparatus 102-1 and the destination apparatus 110 are connected with each other via the network 105. Although the system may have a plurality of destination apparatuses connected via the network as described for FIG. 1, FIG. 2 shows only one connected destination apparatus for illustrative purposes.

The image processing apparatus 102-1 converts input image data into various file formats and transfers the data. A network I/F 210 transfers, to the terminal 110, data converted into a file format by the image processing apparatus 102-1. The network I/F 210 also receives print data such as PDL destined for the image processing apparatus 102-1 from a host computer or the like (not shown). A CPU 211 performs various sorts of software control and computations in the image processing apparatus 102-1. Image vectorization processing for converting an input image into vector data, file format determination, and file format conversion into a file format usable in an application are processed by the CPU 211. A memory 212 is used for purposes such as work memory for processing of the CPU 211 and the like. The memory 212 is also a location into which the CPU 211 loads programs from an HDD 215 for execution.

An operation panel 213 is a user interface through which a user can provide instructions on various operations to the image processing apparatus 102-1. The operation panel 213 consists of a touch panel, keys, and the like. A scanner 214 reads an image from an original such as paper. The HDD 215 is used as a storage device for storing images and so on read by the scanner 214. The HDD 215 also stores programs and data for execution by the CPU 211. In particular, in this embodiment, the HDD 215 maintains a file format table 700 that stores selectable file formats and capability information recommended for referring to the respective file formats.

The destination apparatus 110 receives a file transferred from the image processing apparatus 102-1 and displays the file on an application. A network I/F 220 receives a file transferred from the image processing apparatus 102-1. The network I/F 220 also transmits processing capability information about the destination apparatus 110 in response to a request from the image processing apparatus 102-1. A CPU 221 performs various sorts of software control in the destination apparatus 110. A memory 222 is used for purposes such as work memory for processing of the CPU 221 and the like. The memory 222 is also a location into which the CPU 221 loads programs from an HDD 224 for execution.

A display 223 displays a file received by the destination apparatus 110. The HDD 224 is used as a storage device for storing images and so on transferred from the image processing apparatus 102-1. The HDD 224 also stores applications 225 to be executed by the CPU 221, as well as data.

(Exemplary Software Configuration of Image Processing Apparatus 102-1)

Figure 3:
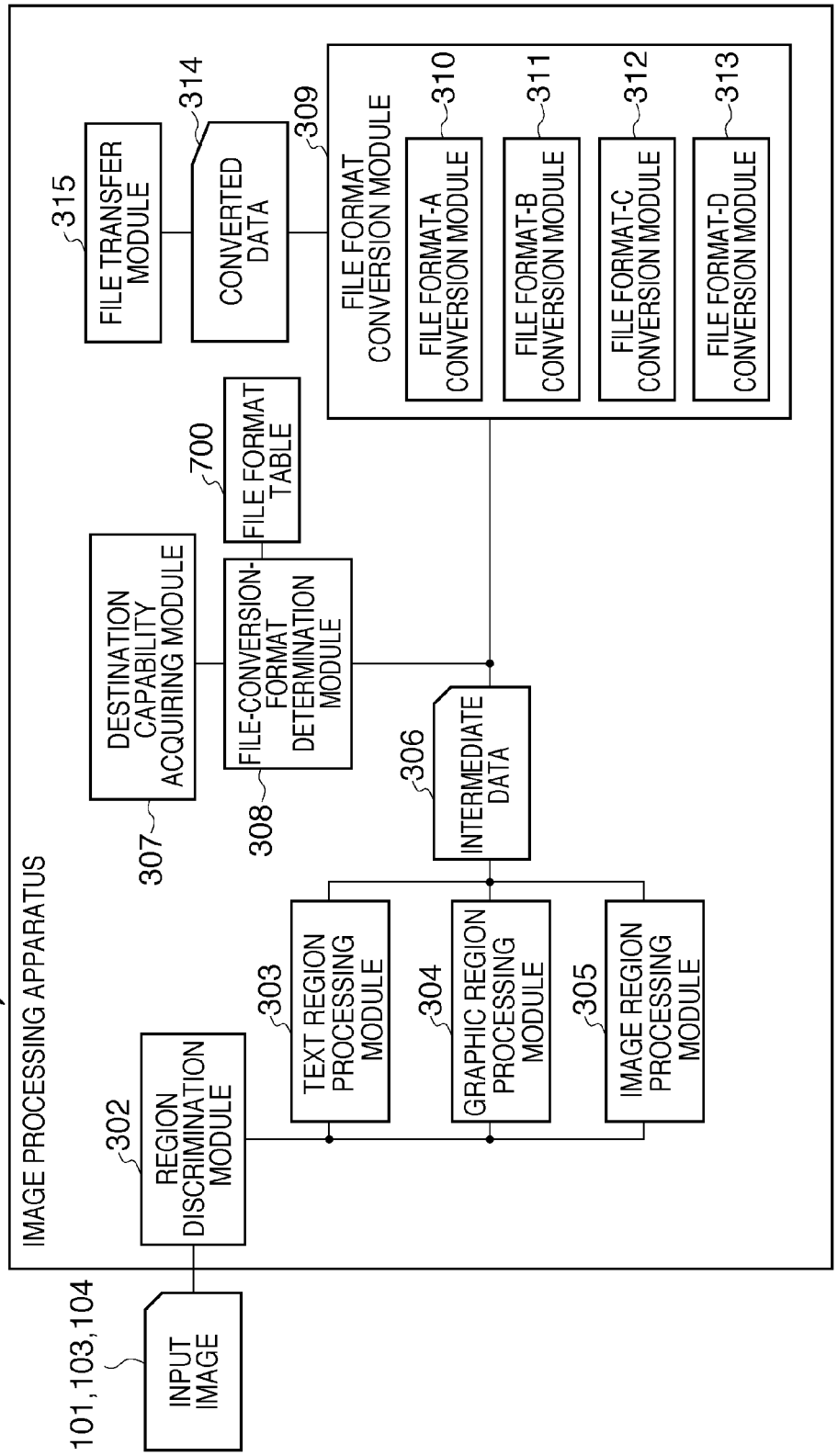
FIG. 3 is a schematic diagram showing an exemplary configuration of software processing performed by the image processing apparatus according to the first embodiment.

FIG. 3 is a schematic diagram showing an exemplary configuration of software processing performed by the CPU 211 in the image processing apparatus 102-1.

Reference numeral 101 (or 103, 104) denotes an input image such as an image read by the scanner 214.

A region discrimination module 302 uses a known region discrimination technique to discriminate regions in the input image 101 and generate region information. The region information is coordinate information specifying quadrilateral regions in the image, and attribute information representing the types of the regions. Any of region discrimination techniques may be employed, including a technique involving directly analyzing an input multivalued image, a technique involving analyzing a binarized image, a technique involving analyzing by generating information such as differential edge information, and the like.

For example, image data can be divided into regions classified by characteristics in terms of form, such as text, a line drawing, a natural image like a photo, and a table.

Figure 4:
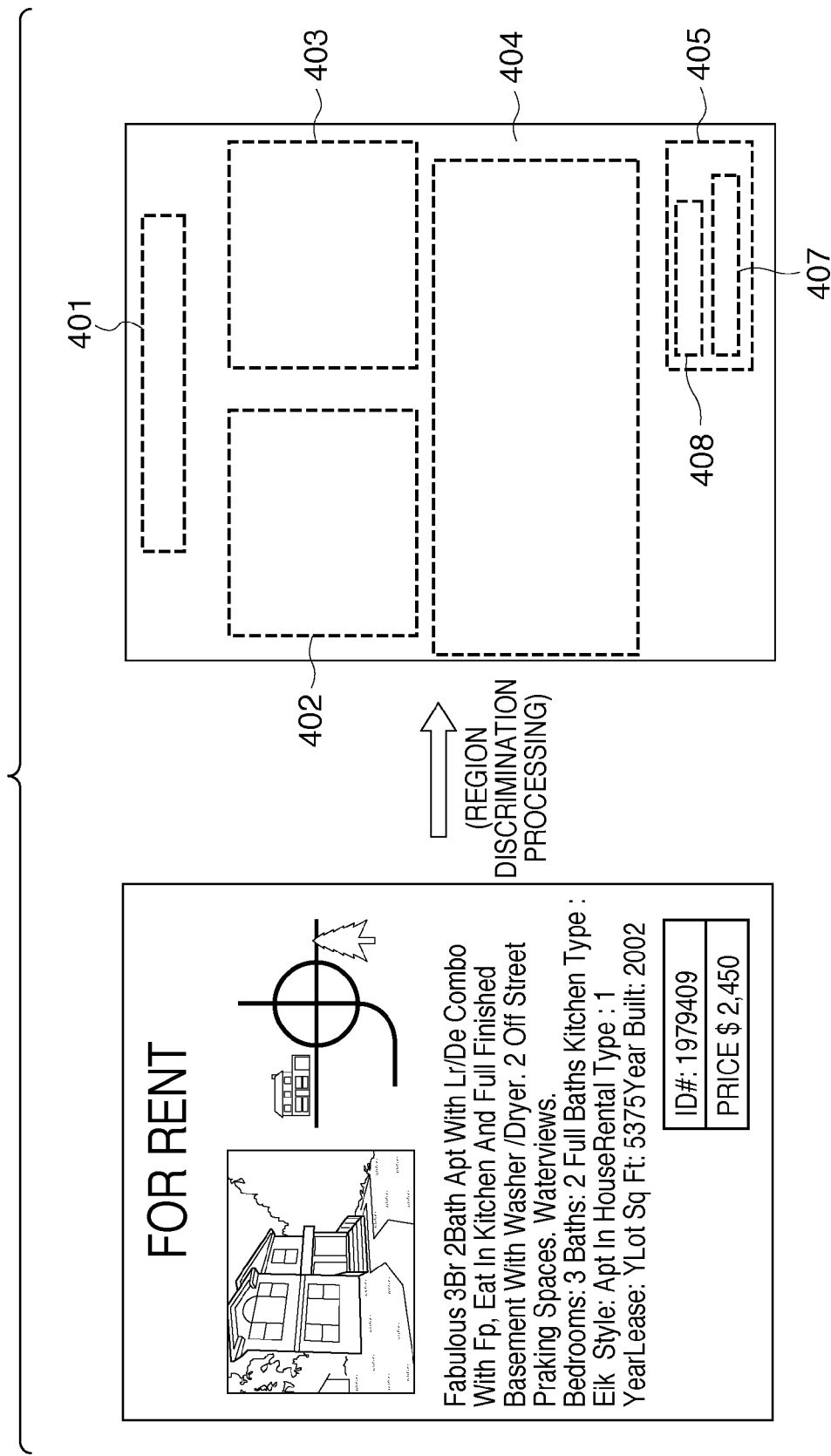
FIG. 4 is a diagram showing exemplary region segmentation processing according to the embodiments.

In FIG. 4, an input image is shown as a left-hand figure, and an exemplary result of region discrimination by the above-described region discrimination processing is shown as a right-hand figure. Reference numerals 401 and 404 denote text regions, reference numeral 402 denotes a photo region, reference numeral 403 denotes a line region, reference numeral 405 denotes a table region, and reference numerals 407 and 408 denote text regions in table cells.

A text region processing module 303 uses a known text recognition technique to recognize, letter by letter, the shapes of binary images of text portion existing in a region and generate a corresponding character code for each letter. An exemplary text recognition technique will be briefly described. First, the row direction is identified from directions that have regular periods based on vertical and horizontal projection in the region, and rows are extracted. Further, projection is taken within each row, and an image of each letter is extracted. For each letter image, edge components and the like are taken and feature-vectorized to determine similarities to feature vectors in a dictionary registered beforehand for all letter types. A character code of a letter with the highest similarity is set as a recognition result.

A graphic region processing module 304 uses a known line-drawing vector information generation technique to generate vector description information that allows a line drawing existing in a region to be drawn with lines, curves, planes, and the like. For example, while a binary image is being raster-scanned, information called an outline vector is generated based on the state of each pixel of interest and its neighbor pixels; in the outline vector, the contour of connected pixel data is written as a set of inter-pixel vectors.

An image region processing module 305 outputs, as image information, natural image information about a photo, picture, or the like existing in a region. This processing produces a small image by simply extracting a relevant portion of image data. Alternatively, the image data may be enlarged, reduced, or compressed as necessary. Intermediate data 306 is a combination of data processed by the above-described region processing modules 303 to 305, and it is stored by the image processing apparatus 102-1 as the intermediate data in the HDD 215 or the like.

The details of the processing of the region discrimination module and region processing modules 302 to 305 described here are only exemplary, and other processing may be performed to generate data for each region. Alternatively, more than one processing result may be generated per region. For example, the text region processing module 303 may perform processing in the same way as the graphic region processing module 304 and generate vector information about letter outlines as the text region information, or this vector information and the character code information resulting from the text recognition may be both the text region information.

A destination capability acquiring module 307 communicates with a user-specified destination terminal and acquires a destination processing capability. The destination processing capability refers to, for example, information including the CPU performance, the size of work memory, and installed applications, of the destination apparatus. In addition, items such as the type of the destination apparatus, the capability of a display device connected to the destination apparatus (e.g., the resolution and the color format), and the data transfer rate may also be included in the destination processing capability.

(Exemplary Information about Destination Processing Capability)

FIG. 5 represents an example of the destination processing capability acquired by the destination capability acquiring module 307 from a destination apparatus. In this figure, for example, the processing capability is written in XML. In FIG. 5, "DEVICETYPE id" indicates the type of the destination apparatus. Types include "computer," "MFP," and the like. "CPU_SPEC id" indicates the type of the CPU 221 of the destination apparatus. "Freq" indicates the clock frequency of the CPU 221. "MEMORY_SIZE id" indicates the type of the memory 222 used by the CPU 221 as work area. "Size" indicates the memory size. "Class" indicates the speed class. Following "APPLICATION id," "List" indicates installed applications. In this regard, "file-create" indicates the presence or absence of the function of generating a file for the applications indicated in the List from a received image, where the value "1" indicates the "presence" and "0" indicates the "absence."

A file-conversion-format determination module 308 refers to the file format table 700 to be shown in FIG. 7 below, in which destination processing capabilities and file formats are maintained in an associated manner. The file-conversion-format determination module 308 then determines a conversion-target file format according to the destination processing capability acquired by the destination capability acquiring module 307. A file format conversion module 309 converts the intermediate data 306 into the file format determined by the file-conversion-format determination module 308. Individual file format conversion modules exist for respective conversion-target file formats. In FIG. 3, reference numerals 310 to 313 correspond to them. A file format-A conversion module 310 converts into the file format A, a file format-B conversion module 311 converts into the file format B, a file format-C conversion module 312 converts into the file format C, and the file format-D conversion module 313 converts into the file format D. The conversion of the file format can be implemented using known techniques. Converted data 314 represents converted data resulting from converting the intermediate data 306 by the file format conversion module 309. A file transfer module 315 transfers the converted data 314 to the destination apparatus.

(Exemplary Configuration of File Format Table)

FIG. 7 is the file format table in which selectable file formats and capability information recommended for referring to the respective file formats are stored.

In FIG. 7, reference numeral 701 denotes the CPU performance of the destination apparatus. Reference numeral 702 denotes the memory storage capacity. Reference numeral 703 denotes a necessary installed application. Reference numeral 704 denotes the data transmission and reception rate. Reference numeral 705 denotes the color format of the display device. Other capability information may further be set, such as the resolution of the display device.

For the above recommended capability information, preferable file formats 710 are stored. Although the four file formats A to D are shown in FIG. 7, this is not limiting.

For a selectable file format, all of its corresponding recommended capabilities shown in FIG. 7 are preferably satisfied. However, not all of the items need to be satisfied but only part of them may be required. For example, the necessary application may be required and the other capabilities may not be required. That is, to be able to support the file format A as a selectable file format, an apparatus requires having WORD VIEWER but does not require the other capabilities. An apparatus having a plurality of applications can select a plurality of file formats, but is configured to preferentially select a file format for which the parameters other than the application parameter can be satisfied. Preferably, the recommended capability for a file format involving complicated processing includes a high value of the CPU performance parameter, and the recommended capability for a file format involving a large file size includes a high value of the communication speed parameter. A priority order is set so that such a selection is preferentially made.

<Exemplary Operation Steps of Image Processing Apparatus in First Embodiment>

FIG. 6 is a flowchart showing exemplary operation steps of the image processing apparatus in the system in the first embodiment. This flowchart is carried out by the CPU 211 of the image processing apparatus 102-1 in FIG. 2 using the memory 212.

The CPU 211 receives a designation apparatus(es) for scan data designated by a user operating the operation panel 213 (S601). Here, a plurality of destination apparatus may be designated so that the data can be transferred to a plurality of destination apparatuses with one operation. Once the destination apparatuses are determined in step S601, the CPU 211 starts scanning an original (S602). The CPU 211 vectorizes the image scanned in step S602 and generates the intermediate data 306 through the region discrimination module 302, as well as the text region processing module 303, the graphic region processing module 304, and the image region processing module 305 (S603).

The CPU 211 determines one of the destination apparatuses designated in step S601 (S604). The CPU 211 acquires, through the destination capability acquiring module 307, the processing capability information about the destination apparatus determined in step S604 (S605). From the processing capability information acquired in step S605, the CPU 211 determines an optimal file conversion format through the file-conversion-format determination module 308 (S606). The optimal file format is determined according to predetermined determination conditions. For example, a table as in the above-described FIG. 7 is used to make the determination. That is, referring to the destination processing capability acquired in step S605, a file format is selected to satisfy the recommended capability (or required capability). If a plurality of file formats are selectable, candidate file formats may be displayed to allow the user to select among them. The determination may also be made according to a predetermined priority order.

The CPU 211 converts, through the file format conversion module 309, the intermediate data 306 into the file format determined in step S606 (S607). The CPU 211 transfers, through the file transfer module 315, the converted data 314 converted in step S607 to the destination apparatus (S608). If the file transfer to all the destination apparatuses designated in step S601 has been finished (YES in S609), the process is terminated. If there are destination apparatuses for which the file transfer has not been finished (NO in S609), the process returns to step S604 to repeat the file transfer processing for the next destination apparatus.

With the above processing, an optimal file format for a destination apparatus can be automatically selected.

Second Embodiment

In a second embodiment, a system will be described in which the file format is selected by further communicating with the access control server 801. Elements with like configurations as in the first embodiment will be described using like symbols. Since the image processing apparatus 102 in the second embodiment has some differences in configuration and operation from the image processing apparatus 102-1 in the first embodiment, it is designated as an image processing apparatus 102-2.

<Exemplary Configuration of Apparatuses in System in Second Embodiment>

Figure 8:
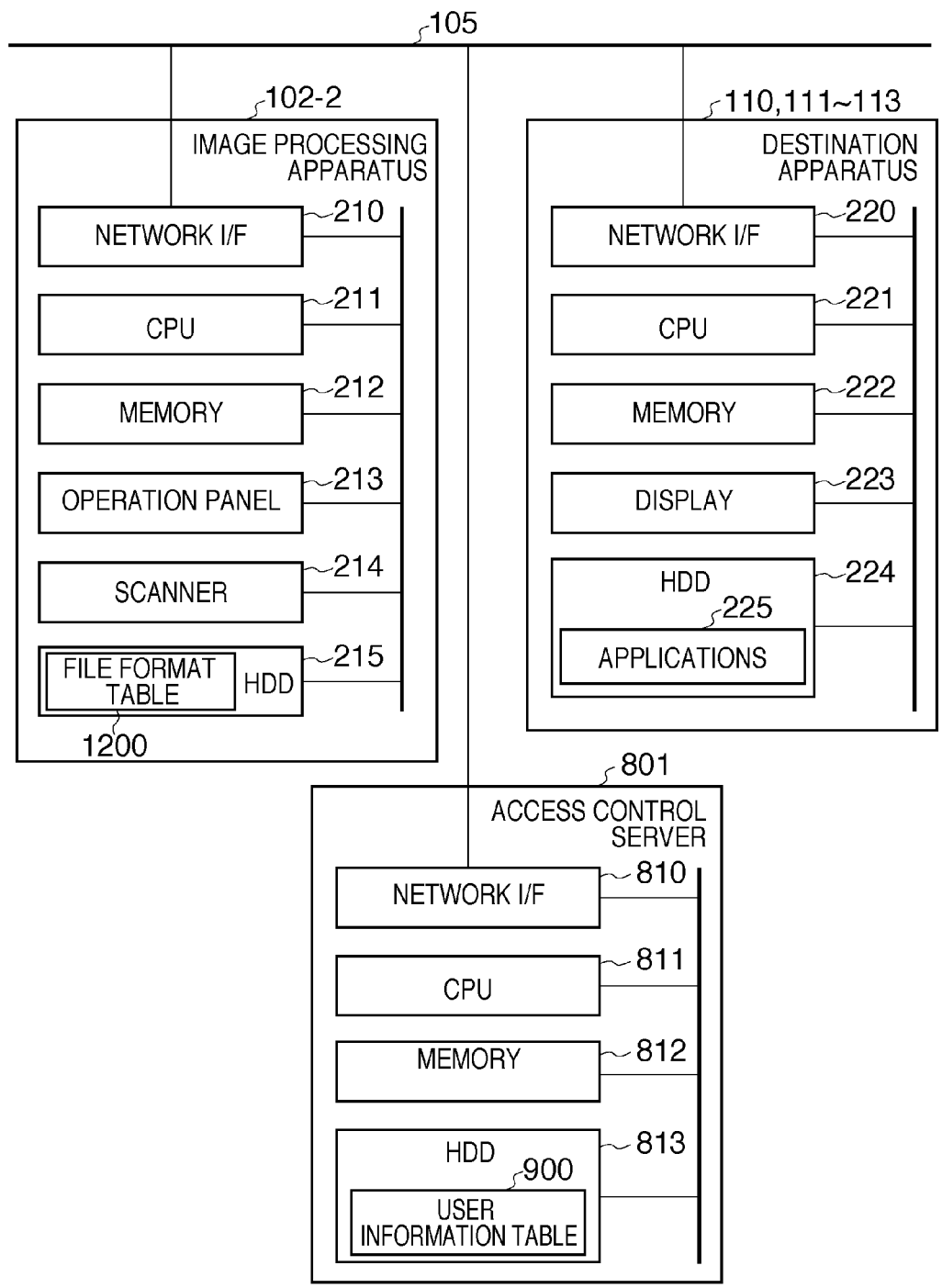
FIG. 8 is a block diagram showing an exemplary configuration of apparatuses in the system according to a second embodiment.

FIG. 8 is a block diagram showing an exemplary configuration of apparatuses in the system according to the second embodiment of the present invention. Elements with like configurations as in the first embodiment will not be described.

In the second embodiment, the access control server 801 is added to the first embodiment. The HDD 215 of the image processing apparatus 102-2 stores a file format table 1200 shown in FIG. 12 below.

The access control server 801 maintains destination information about destination apparatuses and authority information that are associated with respective users (hereinafter collectively referred to as user information). A network I/F 810 transmits the user information to the image processing apparatus 102-2. A CPU 811 performs various sorts of software processing and computations in the access control server 801. A memory 812 is used for purposes such as work memory for processing of the CPU 211 and the like. The memory 812 is also a location into which the CPU 811 loads programs from an HDD 813 for execution. The HDD 813 stores programs and data for execution by the CPU 811, and stores a user information table 900 in the second embodiment.

(Exemplary Configuration of User Information Table)

Figure 9:
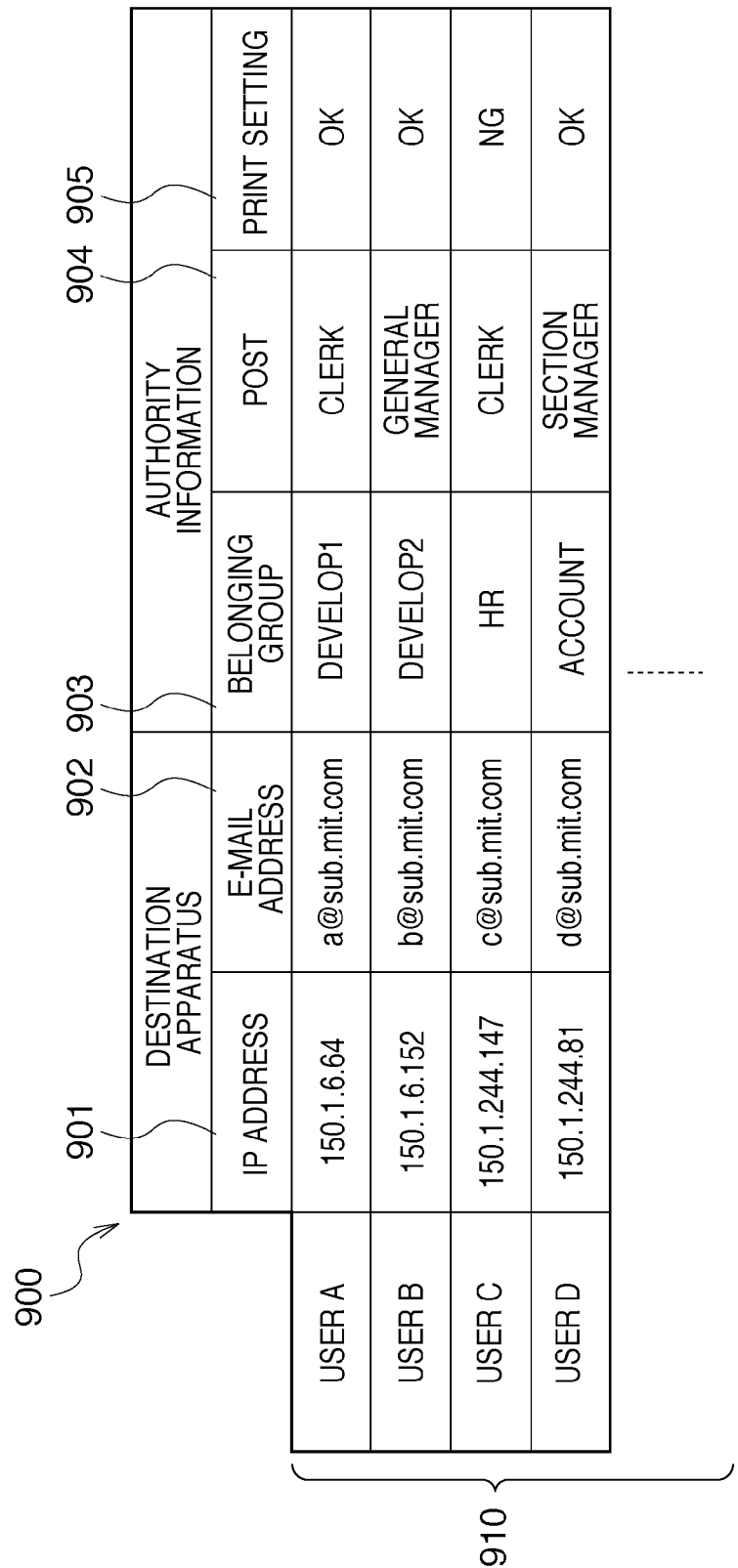
FIG. 9 is a schematic diagram showing exemplary user information according to the second embodiment.

FIG. 9 is a schematic diagram showing an example of the user information table 900.

In FIG. 9, the destination information about destination apparatuses and the authority information are associated with respective users. The destination information about each destination apparatus includes an IP address 901 identifying the destination apparatus and the user's e-mail address 902. In this embodiment, the destination information does not necessarily have to include information identifying a physical apparatus but may only include a recipient like an e-mail address.

The authority information includes personnel information such as a belonging group 903 and a post 904 of each user, and a print setting 905. The print setting 905 is a setting indicating whether or not the user is allowed to print data transferred from the image processing apparatus. These user information items are stored beforehand by a system manager or the like in the access control server 801.

(Exemplary Software Configuration of Image Processing Apparatus 102-2)

Figure 10:
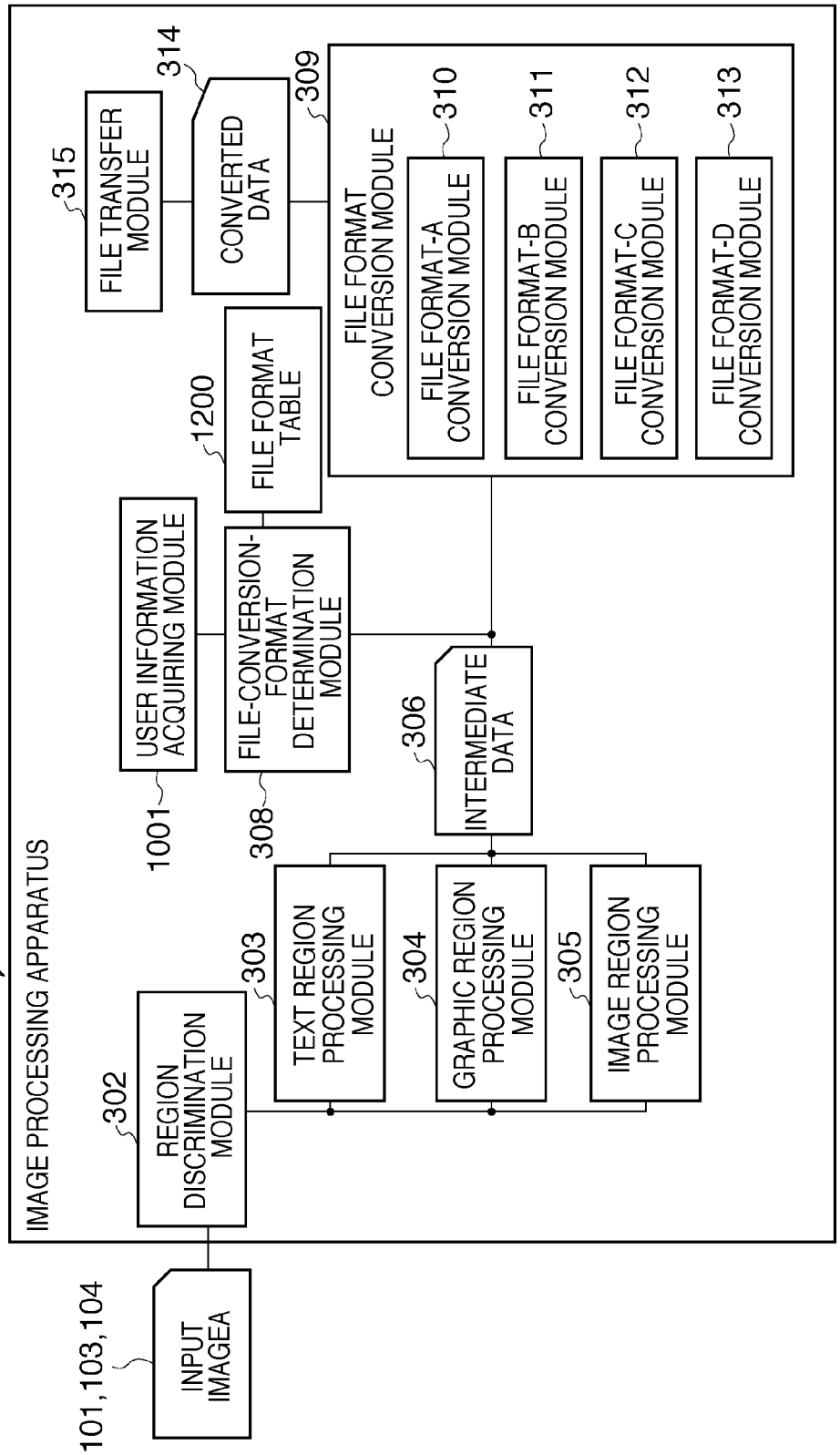
FIG. 10 is a schematic diagram showing an exemplary configuration of software processing performed by the image processing apparatus according to the second embodiment.

FIG. 10 is a schematic diagram showing a configuration of software processing performed by the CPU 211 in the image processing apparatus 102-2 in the second embodiment. Elements with like configurations as in the first embodiment will not be described.

What is different from the first embodiment is that a user information acquiring module 1001 is added in place of the destination capability acquiring module 307. The user information acquiring module 1001 queries the access control server 801 to acquire the user information about a specific user.

Further, the file format table referred to by the file-conversion-format determination module 308 for determining the file conversion format is changed from the file format table 700 in FIG. 7 to the file format table 1200 in FIG. 12.

(Exemplary Configuration of File Format Table)

FIG. 12 is an exemplary configuration of the file format table in which selectable file formats and information such as the authority for referring to the respective file formats are stored in an associated manner.

In FIG. 12, reference numeral 1201 denotes a using group(s) that supports each file format. Reference numeral 1202 denotes post information about permission to refer to the file format. Reference numeral 1203 denotes whether the file format has a print restriction function.

For the above user information, preferable file formats 1210 are stored. Although the four file formats A to D are shown in FIG. 12, this is not limiting.

<Exemplary Operation Steps of Image Processing Apparatus in Second Embodiment>

Figure 11:
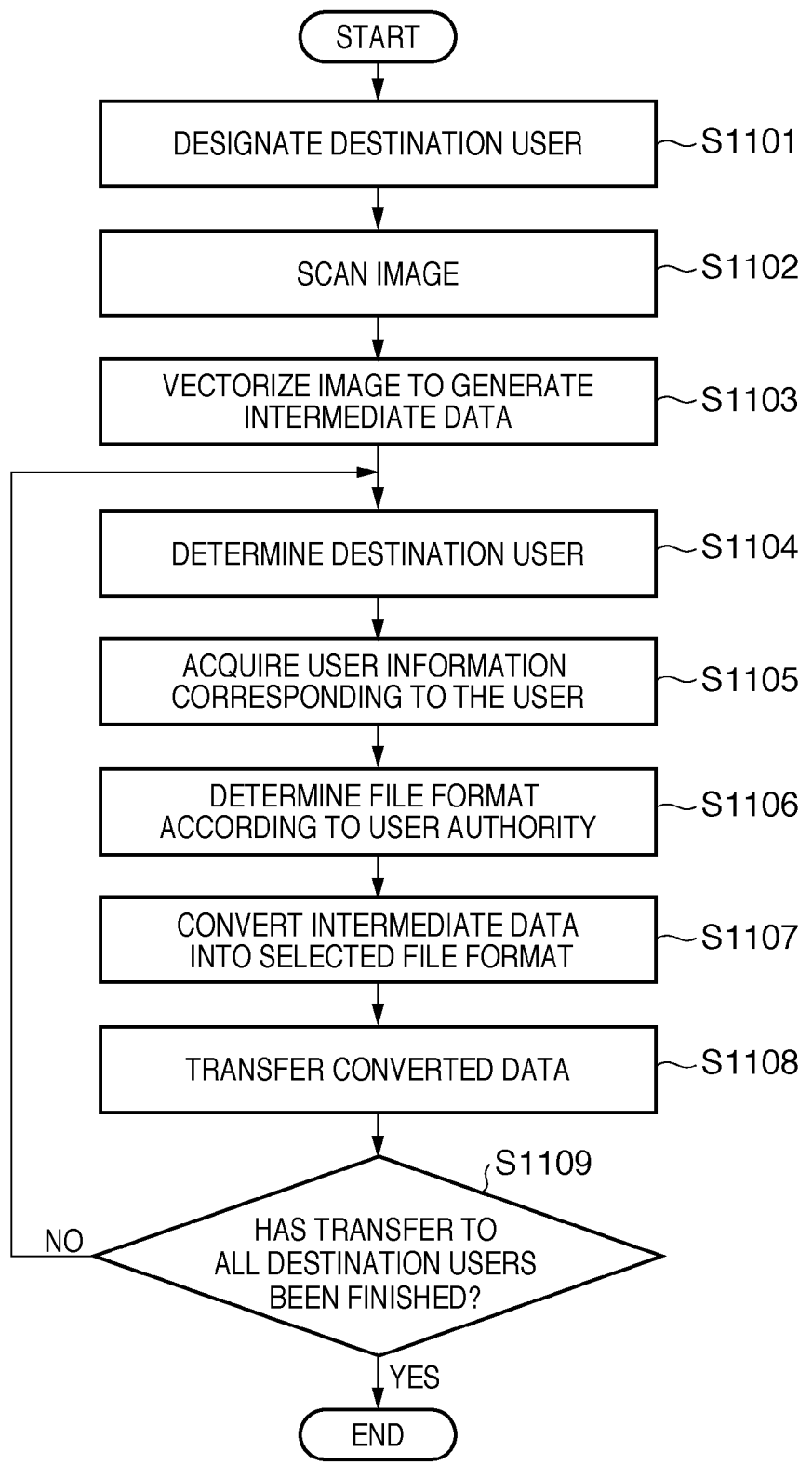
FIG. 11 is a flowchart showing exemplary operation steps of the image processing apparatus in the second embodiment.

FIG. 11 is a flowchart showing exemplary operation steps of the image processing apparatus of the system in the second embodiment. This flowchart is carried out by the CPU 211 of the image processing apparatus 102-2 in FIG. 8 using the memory 212.

The CPU 211 receives a designation user(s) for scan data designated by a user operating the operation panel 213 (S1101). In the first embodiment, destination apparatuses are selected in step S601 of FIG. 6. However, the second embodiment employs a workflow of designating a destination user(s). As in the first embodiment, a plurality of destination users may be designated in the second embodiment so that the data can be transferred to a plurality of destination users with one operation.

Once the destination users are determined in step S1101, the CPU 211 starts scanning an original (S1102). The CPU 211 vectorizes the image scanned in step S1102 and generates the intermediate data 306 through the region discrimination module 302, as well as the text region processing module 303, the graphic region processing module 304, and the image region processing module 305 (S1103).

The CPU 211 determines one of the destination users designated in step S1101 (S1104). The CPU 211 acquires, through the user information acquiring module 1001, the user information corresponding to the destination user determined in step S1104 (S1105). From the user information acquired in step S1105, the CPU 211 determines an optimal file conversion format through the file-conversion-format determination module 308 (S1106). The optimal file format is determined according to predetermined determination conditions. For example, a table as in the above-described FIG. 12 is used to make the determination. The CPU 211 refers to the user information acquired in step S1105 and selects a file format to satisfy the user information.

For example, if the user's group is "HR," selectable file formats are the file formats A, B, and D according to FIG. 12. If the user's job title is "rank and file," the file format D cannot be selected. If printing by the user is "NG," the file format A or C capable of print restriction needs be selected. If a plurality of file formats are selectable, candidate file formats may be displayed to allow the user to select among them. The determination may also be made according to a predetermined priority order.

The CPU 211 converts, through the file format conversion module 309, the intermediate data 306 into the file format determined in step S1106 (S1107). At this point, function restriction information such as about the print restriction is included as necessary so that the information is reflected in the converted file. The CPU 211 transfers, through the file transfer module 315, the converted data 314 converted in step S1107 to a destination apparatus acquired from the user information (S1108). Although the converted data is transferred here to the destination apparatus acquired from the user information, the data may be transferred to an e-mail address also acquired from the user information.

If the file transfer to all the destination users designated in step S1101 has been finished (YES in S1109), the CPU 211 terminates the process. If there are destination users for which the file transfer has not been finished (NO in S1109), the process returns to step S1104 to repeat the file transfer processing for the next destination user.

With the above processing, an optimal file format according to the user information corresponding to a destination user can be automatically selected.

Other Embodiments

In the above embodiments, the first embodiment and the second embodiment have been independently described. Combining these embodiments allows selecting a further preferable file format as follows.

For example, in the second embodiment, an optimal file format is selected from the user information corresponding to a destination user. Further, the destination apparatus information included in the user information may be used to acquire the processing capability information about a destination apparatus as in the first embodiment. In this case, an optimal file format is automatically selected based on the conditions in both the user information and the processing capability information about the destination apparatus. Therefore, more accurate automatic selection is possible.

In the second embodiment, the access control server is separately provided. However, the image processing apparatus may be configured to manage the user information as well, or destination apparatuses may be configured to manage the user information.

Further, in the second embodiment, if the image processing apparatus is connected to a plurality of access control servers, the user operating the image processing apparatus may determine which access control server to access. Also, in the file transfer to a destination apparatus, it may be determined whether or not accessing to the access control server is needed, so that available file formats may be varied depending on the result of the determination.

The present invention may be applied to a system or integrated apparatus composed of a plurality of devices (e.g., a host computer, interfacing device, printer, etc.), or to an apparatus implemented as a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-025096, filed on Feb. 5, 2009, which is hereby incorporated by reference herein in its entirety.

What is claimed is:

1. An image processing apparatus comprising:
a storage unit configured to store first information indicating a destination apparatus to which image data is to be transmitted, and second information indicating whether or not a user is allowed to print image data, wherein the first information and the second information are associated with each other for each user;
a designation unit configured to designate a user;
a scanning unit configured to scan an original to input image data of the original;
a determination unit configured to determine a file format into which the image data input by said scanning unit is to be converted, based on the second information corresponding to the user designated by said designation unit;
a conversion unit configured to convert a file format of the image data input by said scanning unit into the file format determined by said determination unit; and
a transmission unit configured to transmit the image data converted by said conversion unit to the destination apparatus indicated by the first information corresponding to the user designated by said designation unit, wherein the second information corresponding to the designated user is added to the converted image data.

2. The image processing apparatus according to claim 1, wherein said determination unit determines the file format according to a predetermined priority order in a case where a plurality of file formats can be determined as file formats permitted for the user.

3. The image processing apparatus according to claim 1, wherein the file format is processible by the destination apparatus.

4. The image processing apparatus according to claim 1, wherein the first information includes at least one of a CPU performance, a memory storage capacity, a data transmission and reception rate, an installed application, a color format of a display device, and a resolution of the display device, of the destination apparatus.

5. The image processing apparatus according to claim 1, wherein the first information is an IP address or an email address.

6. The image processing apparatus according to claim 1, wherein said determination unit determines the file format according to a predetermined condition in a case where the second information indicates that the user is allowed to print image data, and wherein said determination unit determines the file format into which print restriction is able to be added in a case where the second information indicates that the user is not allowed to print image data.

7. A method of controlling an image processing apparatus, comprising the steps of:
storing first information indicating a destination apparatus to which image data is to be transmitted, and second information indicating whether or not a user is allowed to print image data, wherein the first information and the second information are associated with each other for each user;
designating a user corresponding to a destination;
scanning an original to input image data of the original;
determining a file format into which the image data input by said scanning step is to be converted, based on the second information corresponding to the user designated by said designation step;
converting a file format of the image data input by said scanning step into the file format determined by said determination step; and
transmitting the image data converted by said conversion step to the destination apparatus indicated by the first information corresponding to the user designated by said designation step, wherein the second information corresponding to the designated user is added to the converted image data.

8. The method according to claim 7, wherein the file format includes a file format processible by the destination apparatus.

9. A non-transitory computer-readable storage medium which stores a program causing a computer to execute the steps of the method according to claim 7.

10. The apparatus according to claim 1, wherein a file in the file format has a print restriction function.

* * * * *